(No Model.)

E. J. BROOKS.
SEAL.

No. 345,764. Patented July 20, 1886.

Witnesses
N. C. Newman
Ed. A. Newman

Inventor
EDWARD J. BROOKS,
By his Attorney

UNITED STATES PATENT OFFICE.

EDWARD J. BROOKS, OF EAST ORANGE, NEW JERSEY, ASSIGNOR TO E. J. BROOKS & CO., OF NEW YORK, N. Y.

SEAL.

SPECIFICATION forming part of Letters Patent No. 345,764, dated July 20, 1886.

Application filed May 17, 1884. Serial No. 131,864. (No model.)

*To all whom it may concern:*

Be it known that I, EDWARD J. BROOKS, a citizen of the United States, residing at East Orange, in the State of New Jersey, have invented a new and useful Improvement in Seals, ("G,") of which the following is a specification.

In common with numerous "seal" inventions heretofore patented by me, the present one relates to that class of seals having as a characteristic the employment or use, as a part or the whole of each seal, of a flexible shackle, commonly of "tin" or "wire," the ends of which are united or fastened at the "sealing" operation, and which are or may be easily cut to open or unseal the car-door or other object secured by the seal.

In a previous specification forming part of my application for patent for improvement in seals, ("P,") filed April 10, 1884, Patent No. 303,417, I set forth, as a new departure in this class, certain seals, preferably of pottery and tin, in which the shackle ends are secured within a hard and frangible "seal part" by means of snap-catches, without the customary pressing, punching, or stamping or any use of tools at the sealing operation, and may be quickly liberated by breaking the frangible seal part, as well as by cutting the shackle in the customary manner.

My present invention is additional to that above mentioned, and aims particularly, but not exclusively, at the employment of glass, as well as pottery and other materials, for the seal parts.

It consists, first, in the combination, in such a seal, of a seal part having internal "wedges" in line with its threading hole or holes, and a flexible shackle having at its ends oppositely-projecting elastic snap-catches, the backs of which engage with said wedges, and the catches are thereby secured against retraction; and, secondly, in a flexible shackle fastened at one end within the seal part of such a seal, to unite the parts before they leave the factory, to facilitate handling and applying the seal, and having oppositely-projecting flexible snap-catches at its other extremity, in combination with a seal part having a fastening-recess with internal shoulders to engage said catches, a contracted threading-hole leading into the same, and a wedge in line with said threading-hole, which engages the backs of the catches to prevent their retraction, as hereinafter more fully set forth.

A sheet of drawings accompanies this specification as part thereof.

Figure 1:
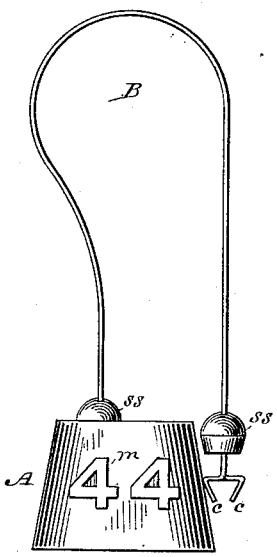
Figure 2:
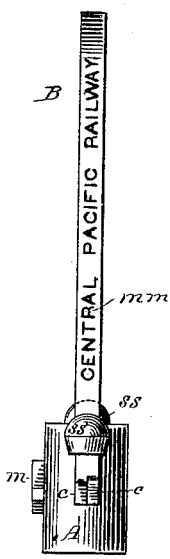
Figure 3:
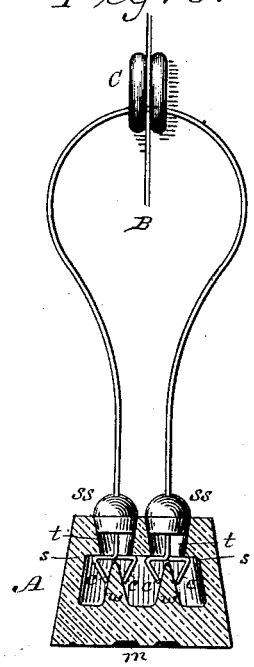
Figure 4:
Figure 5:
Figure 6:
Figure 7:
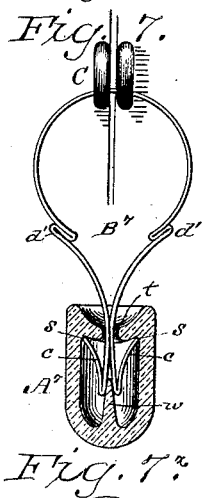

Figure 1 of the drawings is a face view, and Fig. 2 an edge view, of a glass and tin seal illustrating this invention, the seal being shown in that condition in which it leaves the factory, ready for use. Fig. 3 represents a front view of the same seal, partly in section, applied to a pair of sealing-staples and fastened. Fig. 4 is a top view of the seal part; Fig. 5, an end view of the shackle, and Fig. 6 a bottom view of the fastened seal. Fig. 7 is a sectional elevation of another seal, illustrating a modification; and Fig. 7$^\times$ is an end view of its seal part.

Like letters of reference indicate corresponding parts in the several figures.

This improved seal in all its forms is composed of a hollow seal part, A or A', of glass or other hard and rigid (*i. e.*, relatively hard and rigid) material, adapted to be made in one part and without inclosed springs, and having in connection with its cavity or recess, as seen in the sectional views, threading-holes $t$, one or more, and square or substantially square catch-shoulders $s$ at the inner ends of said threading-holes, and a flexible metallic shackle, B or B', having its respective extremities formed into snap-catches $c$, with flexible barbs, which yield to enter said threading-holes, and coact directly with said shoulders to prevent withdrawal, as aforesaid, as clearly seen in Figs. 3 and 7.

In the spaces represented by Figs. 1 to 6, inclusive, the shackle B is provided with threading-hole stoppers or masks $s\ s$, which fit over and preferably into the respective threading-holes $t$ when the respective shackle ends are fastened, and preclude tampering with the catches $c$ by means of instruments inserted through the threading-holes. The stoppers $s\ s$ may be of the same material as the seal part A, or preferably of lead, which can be more readily cast on the shackle ends in the ways seal disks and rivets have heretofore been cast on, as described by me in previous specifications.

To prevent manipulating the catches $c$ by means of the shackle ends themselves, so as to release them, internal wedges, $w$, are provided in the seal part A, each being located in line with the middle of the corresponding threading-hole, $t$, so as to enter between the inner ends of a pair of catches inserted therethrough, expanding the same more or less, so that when they spring behind the shoulders $s$ they will be tight, and the wedge will effectively resist working either catch free. They are aided, to this end, by the penetrating stoppers $s$ $s$ in the construction represented, any lateral movement of the shackle end bodily being resisted by the latter. Each shackle end is fastened independently of the other, each having in the construction represented a pair of catches integral therewith, formed, as clearly shown in Figs. 2, 3, and 5, by slitting the end and bending its respective parts outward at right angles and their extremities downward and inward into shape. Double catches so formed, in combination with said wedges, form part of my present invention, and fastening the respective ends individually is preferred, although they may be fastened simultaneously.

By fastening one shackle end in the factory, as represented by Figs. 1 and 2, the seal is given the great advantages of "one-part" seals in handling and applying it. This is accomplished, after the respective parts are finished and inspected, by simply inserting one end, preferably the left-hand end, of each shackle into the appropriate threading-hole of a corresponding seal part, which can be quickly done by little boys or girls, and materially facilitates the subsequent sealing operation, in which the other shackle end is fastened after passing it through car-door staples C, or otherwise applying the seal, leaving the seal in the condition represented by Fig. 3. The condition of the fastening or fastenings within the seal part is at all times manifested, and straining the catches by pulls in inspecting the seals is obviated by making the seal part A of transparent—i. e., sufficiently transparent—glass. It may be so made by methods in use for making hollow ware of glass, and made in molds, as I propose. It may be provided with station-numbers and road-initials $m$ $m'$, for example, in cameo and intaglio, respectively, as represented, or both or either or any preferred mark in either style; or it may be provided with equivalent distinguishing-marks by the sand-blast or other approved methods of marking glass not easily counterfeited. The tin—that is, tin-plate—shackle B may also be provided with suitable lettering or distinguishing-marks, $m$ $m$, as described by me in previous specifications, or in any approved way. The stoppers $s$ $s$ may be also guarded by the patent-mark, for example. The seal, released by cutting one shackle end, may be preserved with all its marks as well as its fastenings intact until the goods guarded by it are found to be all right.

In the modification illustrated by Figs. 7 and $7^\times$, the seal part $A^7$ is intended to be made of glass or other hard and rigid material in one part, and the shackle $B^7$ of flat wire, with its respective ends formed into single snap-catches $c$. The seal part $A^7$ has a single threading-hole, $t$, adapted to admit three or four thicknesses of the wire. If both ends are inserted simultaneously, four thicknesses must pass; but in practice I propose to fasten one end preliminarily, as described with reference to Figs. 1 and 2, and in this case the hole need accommodate but three thicknesses, and confined to this would obviously be self-guarded against the insertion of unfastening instruments. A concave top facilitates inserting the shackle ends, and internal shoulders, $s$, conformed thereto, are retreating or "under-cut," so as to aid in resisting attempts to release either catch. A single central wedge, $w$, coacts with the catches of both fastened shackle ends.

I have simply shown cameo distinguishing-marks $m$ in Fig. 7. I propose using also intaglio marks molded, stamped, cut, or burned in in any approved way; also printed marks and the like, made permanent by burning or baking them in, as applied to seal parts of pottery, cast metal, or other material adapted to be so treated. The seal parts may also be made of diversified shapes and colors, as well as of various sizes and single or double, to distinguish those of different roads or users. I also propose guarding shackles of flat wire and tin and other sheet metals, as used in these seals, by coating the same with paints of different colors, and by my detector-folds, as represented at $d'$, Fig. 7, the latter to be stamped at the factory, and the stock to be selected with reference to breaking at its bends under such strains as would be necessary to forcibly withdraw a shackle end.

In my claims I will use the term "self-fastening" for brevity to describe the special class of seals hereinbefore specified.

Having described my said improvement in seals, ("G,") I claim as my invention and desire to patent under this specification—

1. The combination, in a self-fastening seal, of a hollow seal part having a threading hole or holes, internal catch-shoulders at the inner ends of said hole or holes, and internal wedges in line with said hole or holes, and a flexible metallic shackle having its extremities formed into oppositely-projecting snap-catches, substantially as herein specified, for the purpose set forth.

2. In a self-fastening seal, a flexible metallic shackle fastened at one end within the seal part, and having oppositely-projecting flexible snap-catches at its other extremity, in combination with a hollow seal part having a threading-hole, internal shoulders at the inner end of said hole, and an internal wedge in line with said hole, to receive and coact with said snap-catches, substantially as herein specified, for the purposes set forth.

EDWARD J. BROOKS.

Witnesses:
HENRY L. C. WENK,
J. FARLEY HOVEY.